United States Patent
Huang

(10) Patent No.: US 6,717,902 B2
(45) Date of Patent: Apr. 6, 2004

(54) LOCK MECHANISM FOR OPTICAL DISK DRIVE ASSEMBLY

(75) Inventor: Hui-Chu Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 27 days.

(21) Appl. No.: 10/128,552

(22) Filed: Apr. 23, 2002

(65) Prior Publication Data

US 2003/0076763 A1 Apr. 24, 2003

(30) Foreign Application Priority Data

Oct. 23, 2001 (TW) ...................................... 90218103 U

(51) Int. Cl.[7] .............................................. G11B 33/02
(52) U.S. Cl. ..................................................... 369/75.1
(58) Field of Search ............... 369/75.1, 79; 292/251.5; 206/1.5; 70/276

(56) References Cited

U.S. PATENT DOCUMENTS

| | | | | |
|---|---|---|---|---|
| 4,412,320 | A | * 10/1983 | Yamakawa | .................... 369/79 |
| RE38,226 | E | * 8/2003 | Sugie et al. | ............... 369/75.1 |
| 2002/0089190 | A1 | * 7/2002 | Wang et al. | ............. 292/251.5 |
| 2002/0131355 | A1 | * 9/2002 | Lin | ........................... 369/75.1 |

* cited by examiner

Primary Examiner—George J. Letscher
(74) Attorney, Agent, or Firm—Thomas, Kayden, Horstemeyer & Risley

(57) ABSTRACT

Lock mechanism for an optical disk drive assembly. The optical disk drive assembly includes a housing, an electromagnetic lock and a resilient piece. The housing includes a lid. The lid is locked or unlocked by the electromagnetic lock. The lid is opened by the resilient piece when the lid is unlocked.

12 Claims, 4 Drawing Sheets

LOCK MECHANISM FOR OPTICAL DISK DRIVE ASSEMBLY

BACKGROUND OF THE INVENTION

1. Field of the Invention

The present invention relates to a lock mechanism for an optical disk drive assembly (CD-ROM drive, DVD-ROM etc.). In particular, the present invention relates to an electromagnetic lock for the lid of an optical disk drive assembly.

2. Description of the Related Art

A CD-ROM drive (Compact Disc-Read Only Memory) reads data (e.g. image or music data) from compact disks and transmits the data to a computer via data bus.

Recently slot-type and lid-type CD-ROM drives have become available. A slot-type CD-ROM drive has a slot, through which CDs are disposed in the CD-ROM drive. However, the slot also allows entry of foreign objects into the CD-ROM drive, which may damage the CD-ROM drive.

A lid-type CD-ROM drive has a lid to protect the compact disk inside. In operation, the compact disks maybe accidentally ejected if the lid is opened by accidental means. Therefore, a lock assembly for the lid is required.

SUMMARY OF THE INVENTION

An object of the present invention is to provide a lock assembly to prevent accidental opening of the lid of a lid-type CD-ROM drive.

The CD-ROM drive of the present invention includes a housing, an electromagnetic lock and a resilient piece. The housing includes a lid. The lid is locked or unlocked by the electromagnetic lock. The lid is opened by the resilient piece when the lid is unlocked.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
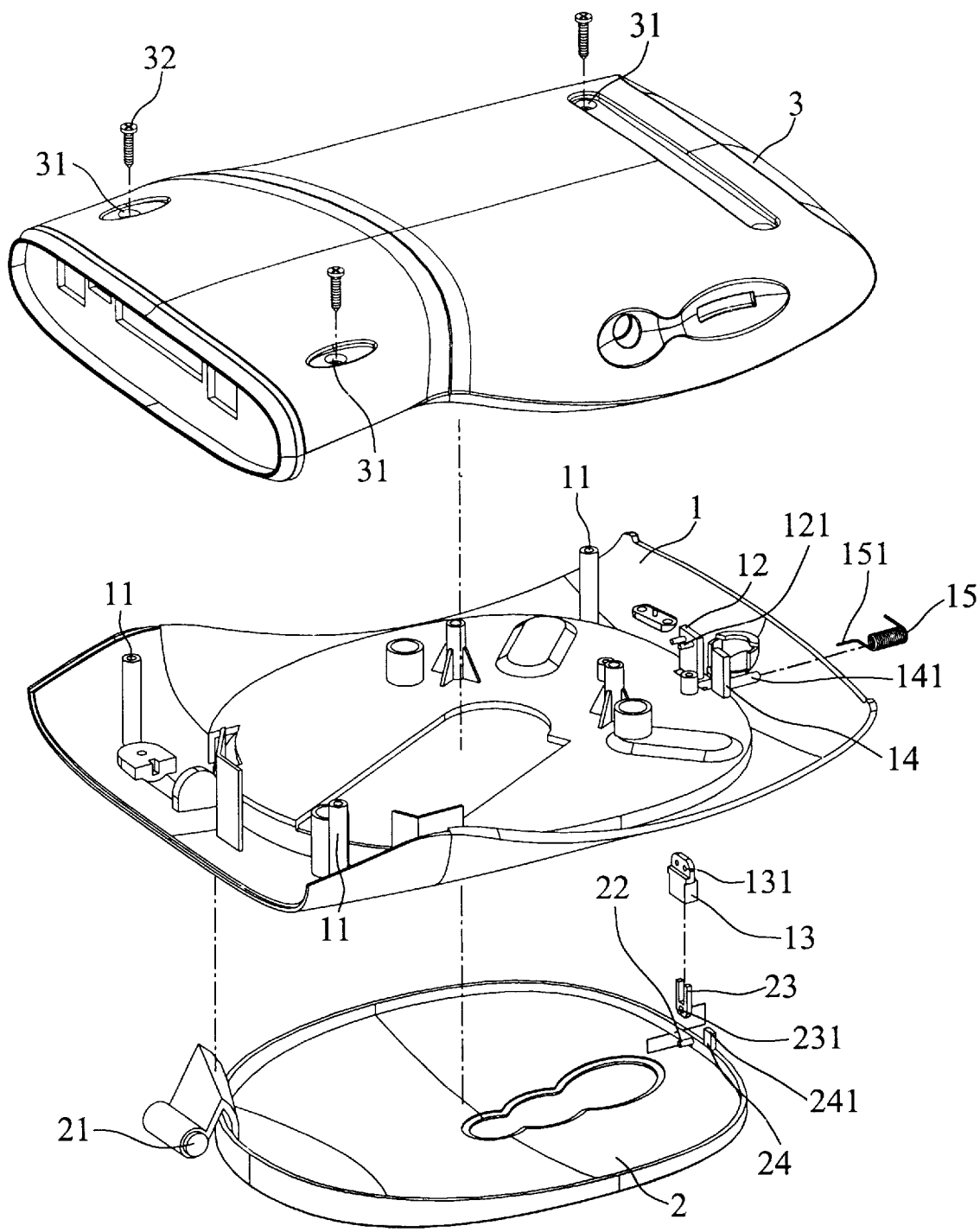
FIG. 1 is an exploded perspective diagram of the housing of a CD-ROM drive in accordance with the present invention, observed from the bottom thereof.
Figure 2:
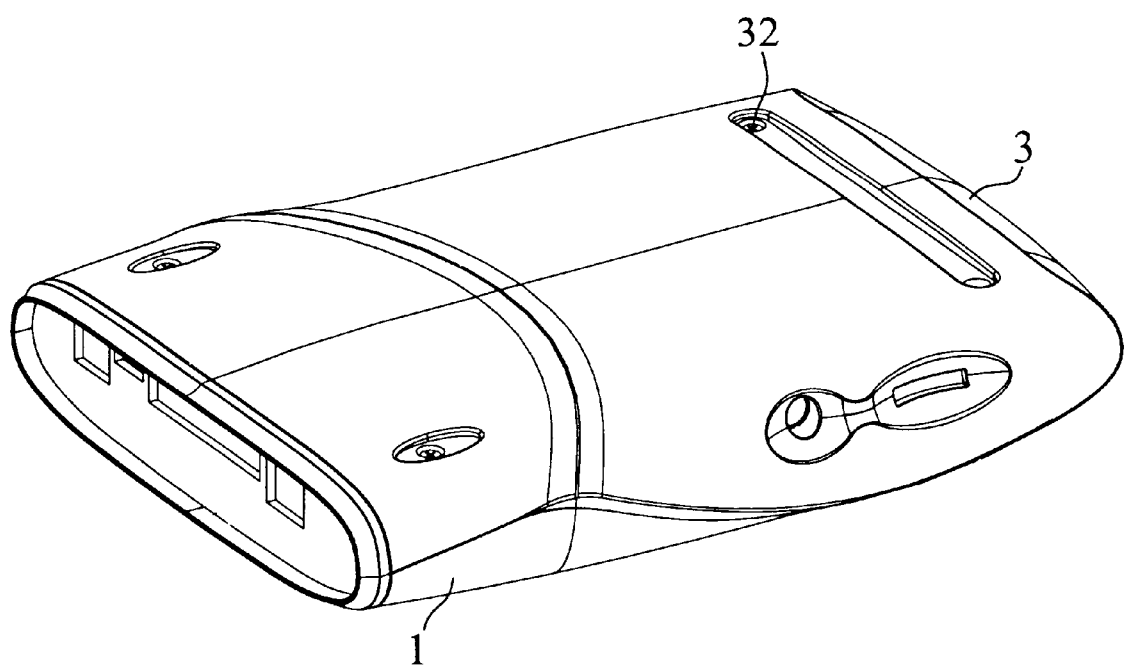
FIG. 2 depicts the assembled housing of FIG. 1.

Referring to FIGS. 1–4, a CD-ROM drive housing of the present invention has a top piece 1, a lid 2 and a bottom piece 3. The data-reading assembly (not shown) of the CD-ROM drive is mounted on the top piece 1. The top piece 1 has a plurality of tubes 11, which have inner threads. The bottom piece 3 of the CD-ROM drive housing defines a plurality of through holes 31. Screws 32 are twisted through the holes 31 into the tubes 11 to fix the top and bottom pieces 1, 3 together. The lid 2 is connected to the top piece 1 via a pivot 21.

The top piece 1 of the CD-ROM drive housing has a magnet mount 12 and two pins 121 extending from the magnet mount 12. An electromagnet 13 has two holes 131. The pins 121 are disposed in the holes 131 to fix the electromagnet 13 to the magnet mount 12.

The top piece 1 of the CD-ROM drive housing further has a spring mount 14 and a pin 141 extending from the spring mount 14. A torsion spring 15 surrounds the pin 141 and has a portion 151 against the lid 2.

A magnet 23 has a hole 231 while the lid 2 has a pin 22 fitted in the hole 231 to fix the magnet 23. It is noted that the magnet 23 and the electromagnet 13 constitute an electromagnetic lock for the lid 2.

Furthermore, the lid 2 has a post 24, while the post 24 has a surface 241 against the portion 151 of the torsion spring 15.

Figure 3:
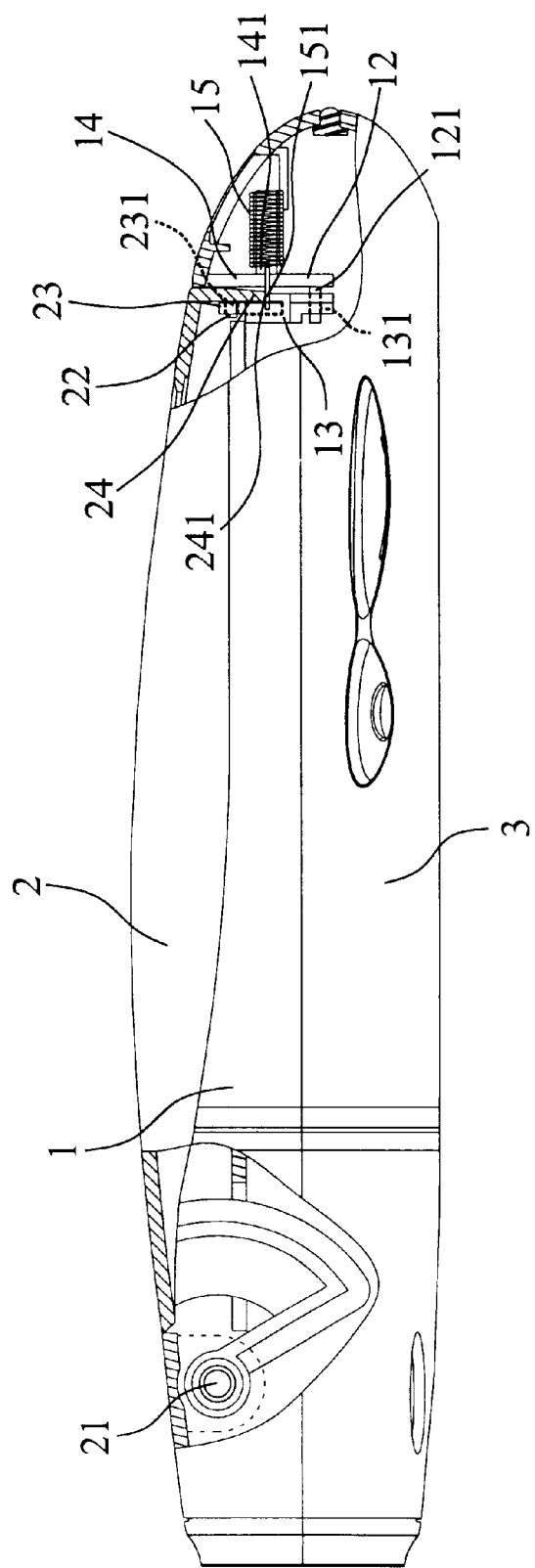
FIG. 3 is a sectional diagram of the assembled housing of FIG. 1, with the top thereof up.
Figure 4:
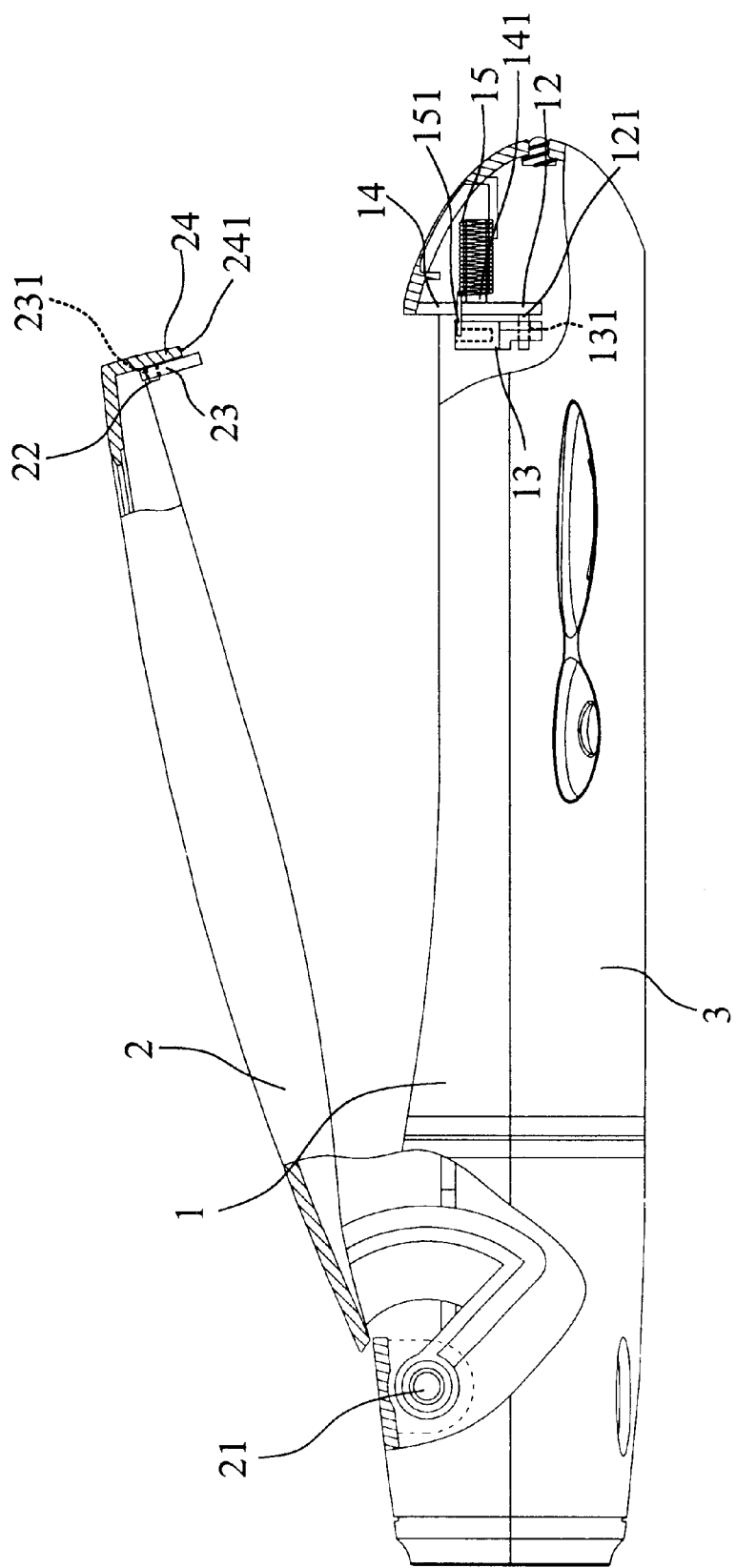
FIG. 4 depicts the housing of FIG. 3, wherein the lid thereof is opened.

Referring to FIG. 3, the lid 2 of the CD-ROM drive is locked via attraction between the magnet 23 and the electromagnet 13. When the user opens the lid 2, an electric current is passed through the coil of the electromagnet 13 to generate an exclusive force between the magnet 23 and the electromagnet 13, thereby unlocking the lid 2. The lid 2 is then opened by the spring 15, as shown in FIG. 4, wherein the portion 151 of the torsion spring 15 applies a force to the surface 241 of the post 24 of the lid 2.

In conclusion, the present invention provides an electromagnetic lock assembly for preventing an accidental opening of the lid. It is understood that the present invention is also adapted for DVD-ROM or other optical disk drive assemblies.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical disk drive assembly, comprising:
   a bottom piece;
   a top piece, mounted to the bottom piece;
   a lid, connected to the top piece;
   an electromagnet, mounted on the top piece;
   a magnet, mounted on the lid;
   a resilient piece, mounted on the top piece; and
   wherein the lid is unlocked and opened by the resilient piece when an electric current passes through the electromagnet.

2. An optical disk drive assembly as claimed in claim 1, wherein, the lid is locked when no electric current passes through he electromagnet and magnet attracts the electromagnet.

3. An optical disk drive assembly as claimed in claim 2, further comprising an electromagnet mount fixed to the housing, and wherein the electromagnet has at least one hole and the electromagnet mount has at least one pin corresponding to the hole of the electromagnet.

4. An optical disk drive assembly as claimed in claim 2, further comprising a pin fixed to the lid, and wherein the magnet defines at least one hole and the pin is fitted in the hole to fix the magnet.

5. An optical disk drive assembly as claimed in claim 1, further comprising a spring mount fixed to the housing, and wherein the resilient piece is a spring fixed to the spring mount and pushes against the lid.

6. An optical disk drive assembly as claimed in claim 5, wherein the lid comprises a post, and the resilient piece pushes against the post.

7. An optical disk drive assembly as claimed in claim 5, wherein the spring is a torsion spring.

8. An optical disk drive assembly, comprising:
   a bottom piece;
   a top piece, mounted to the bottom piece and having an electromagnet mount and a spring mount;
   a lid, connected to the top piece;
   an electromagnet, mounted on the electromagnet mount of the top piece;
   a magnet, mounted on the lid;
   a resilient piece, mounted on the spring mount of the top piece; and
   wherein the lid is unlocked and opened by the resilient piece when an electric current passes through the electromagnet, and the lid is locked when no electric current passes through the electromagnet and magnet attracts the electromagnet.

9. An optical disk drive assembly as claimed in claim 8, wherein the electromagnet has at least one hole and the electromagnet mount further comprises at least one pin corresponding to the hole of the electromagnet.

10. An optical disk drive assembly as claimed in claim 8, wherein the lid comprises a post, and the resilient piece pushes against the post.

11. An optical disk drive assembly as claimed in claim 8, wherein the spring is a torsion spring.

12. An optical disk drive assembly as claimed in claim 8, further comprising a pin fixed to the lid, and wherein the magnet defines at least one hole and the pin is fitted in the hole to fix the magnet.

* * * * *